United States Patent Office 2,790,704
Patented Apr. 30, 1957

2,790,704

PROCESS FOR PRODUCING A VAPORIZED MIXTURE OF ALUMINUM AND TITANIUM HALIDES

Ernest D. Lewis, Swarthmore, Pa., assignor to E. I. du Pont de Nemours and Company, Wilmington, Del., a corporation of Delaware No Drawing. Application January 19, 1953,
Serial No. 332,083

10 Claims. (Cl. 23—87)

This invention relates to the preparation of a vaporized aluminum halide reactant, and more particularly to novel and improved processes for preparing a vaporized mixture of said halide with a vaporized titanium halide. More specifically, it relates to novel procedures for obtaining aluminum chloride free of undesired impurities, the presence of which interferes with the use of said chloride in the vapor phase oxidation of titanium tetrachloride to obtain $TiO_2$ pigments.

The vapor phase oxidation of titanium tetrachloride to obtain pigmentary titanium dioxide and the beneficial effects obtained from the co-oxidation of aluminum and titanium halides in such process are already known, being particularly disclosed in U. S. Patent 2,559,638. In accordance with the procedures of that patent, an improved type of pigment titanium dioxide, in either rutile or anatase crystalline form, is obtained by decomposing in the vapor phase titanium tetrachloride and a small amount of aluminum chloride under controlled oxidation conditions and in the presence of small, regulated quantities of water vapor.

One method of adding the aluminum chloride or other halide to a titanium halide, such as titanium tetrachloride, comprises adding solid aluminum chloride to liquid titanium chloride, followed by vaporization of the mixture through heating. Disadvantageously, the best commercial aluminum chloride available contains some undesired quantities of combined moisture, the presence of which increases the fouling rate of the heat transfer surfaces and renders the vaporization difficult and highly uneconomical. The fouling disadvantage is also inherent in the vaporization of the solid aluminum halide prior to its addition to the titanium halide. In addition, such best-grade aluminum chloride contains interfering metallic halides as impurities which originate in its manufacture or in the subsequent handling of the material. These are more likely to be transferred to the oxidation process as contaminants which deleteriously affect the final $TiO_2$ product quality.

Another method of effecting aluminum halide addition to a titanium halide is to generate the aluminum halide within the reactor by introducing the halogen into liquid aluminum and mixing of the resulting halide vapor with the titanium halide vapor. With presently available materials of construction, it is difficult to design the required equipment for operating at an elevated pressure and obtaining the heat transfer characteristics necessary in a commercial, practical unit. The problem of heat removal during operation and of supplying of heat when not operating, to maintain the aluminum liquid, is extremely difficult of satisfactory solution.

Another method involves the introduction of the halogen alone or with other gases into a static bed of aluminum metal particles, the maximum temperature being limited to prevent aluminum melting. This method is impractical as a dependable source of the aluminum halide, especially in a continuous type process, due to the lack of effective temperature control, i. e., localized areas become overheated and undesired melting of aluminum occurs. This results in channeling and in decreasing the surface area of the aluminum per unit weight of bed with consequent serious irregularities in the production rate.

It is among the objects of this invention to overcome these and other disadvantages characterizing prior processes for preparing and utilizing vaporized mixtures of an aluminum halide and a titanium tetrahalide. Particular objects include the provision of a novel process for the preparation of vaporized aluminum halide and titanium tetrahalide mixtures; the preparation of a mixture of aluminum chloride and titanium chloride free of interfering contaminating impurities and which is especially adaptable for use in a vapor phase oxidation process for obtaining titanium dioxide from titanium tetrachloride; to generate and use an aluminum halide vapor without recourse to the intermediate steps of condensation and revaporization required in such prior procedures; to provide means of dissipating the heat of the reaction of aluminum and the halogen in such vapor phase oxidation, thus simplifying the process in regard to equipment design and reaction control; and to prepare a mixture of aluminum trichloride, titanium tetrachloride and chlorine which is readily suitable for introduction into a titanium tetrachloride vapor stream of a vapor phase oxidation process for producing titanium dioxide. Other objects and advantages of the invention will be apparent from the ensuing description thereof.

These and other objects are attained in this invention which comprises forming impurity-free, vaporized aluminum trihalide for admixture with a titanium tetrahalide also free of other metal halide impurities, by charging discrete aluminum metal particles into a closed reactor for maintenance therein in the form of a fluidized bed with a larger proportion of finely divided inert solid particles by means of a mixture of halogen vapor and a vaporized titanium halide, said halogen components having an atomic number of 17 to 53 and the titanium halide being the major component of the mixture, and maintaining the temperature of said fluidized bed at below the softening temperature of said aluminum metal particles and above the condensation temperature of the aluminum halide vapor product which forms.

In a more specific embodiment, the invention comprises charging finely divided, discrete particles of aluminum metal into a conventional type fluidized bed reactor in which a temperature ranging from about 180° C.– 400° C. is maintained, suspending said particles and an inert, solid material in finely divided condition therein in the form of a fluidized reaction bed by simultaneously charging thereto gaseous chlorine and titanium tetrachloride, and continuously withdrawing from said reactor a gaseous mixture containing the desired pure aluminum chloride product thus formed.

In practically applying the invention, recourse to a conventional type of fluidized bed chlorinating reactor is had. This comprises a corrosion-resistant or other desired form of metal cylindrical reactor adapted to be externally or otherwise wall-cooled, having a height-to-diameter ratio of the order of 10:1 and provided with suitable inlet and outlet means for separately charging reactants or other products thereto and withdrawing reactants and reaction products therefrom. The vessel is provided with valved or other means for continuously introducing a premixed fluidizing gas comprising, for example, gaseous chlorine and titanium tetrachloride vapor for flow through the vessel at a controlled high linear velocity; for continuously or intermittently charging a granular aluminum metal therein, also at a controlled rate and above the fluidized bed; for introducing a secondary source of chlorine gas above said bed; as well as suitable means for removing the product gas mixture comprising aluminum chloride vapor, heated titanium chloride vapor and unreacted chlorine vapor at relatively low linear velocity. Suitable means, such as a cyclone or other form of conventional separator, for separating entrained solid reaction bed fines from the product gas stream can be associated with the reactor, together with means for returning or recycling to the bed the larger bed particles carried into the product gas stream. Within the reactor, and as the major part of the fluidized bed, suitable inert solid fines, such as a silicate material and finer in particle size than the initial particles of the granular aluminum metal reactant used, is provided, said inert solid fines advantageously serving to lessen the required suspending velocity of the input fluidizing medium, to dilute spacially the aluminum metal reactant particles, to absorb and subsequently transfer excess heat of reaction to the fluidizing coolant non-reactant titanium tetrachloride gas, and to assist in scrubbing and transferring heat to the cooled walls of the reactor. During the chlorination the reactor temperature is maintained substantially below the softening temperautre of the aluminum reactant metal particles (usually within the range of 180–400° C.) to avoid any possibility of gas channeling due to aggregated particles or impeded fluidization of the bed, and a reactor wall is maintained above 180° C.–386° C., depending on the halogen component of the system. The rate of fluidizing gas addition is controlled so that the bed of inert solid particles and aluminum metal reactant particles is expanded and continuously maintained in a fluidized condition, whereby efficient commingling and commixing of the solids with each other and with the fluidizing gases will be effected. Granular aluminum metal feed particles are continuously or intermittently introduced into the reactor and fall onto the fluidized bed, and are suspended and mixed therein. The chlorine reacts with the aluminum to form aluminum trichloride, the degree of chlorine utilization being dependent upon the reactive aluminum surface area and temperature. The reaction is exothermic and elevates the temperature of the reactor contents, both solids and gases, the bed temperature being controlled, however, to a level below that of the softening point of aluminum, by regulating the quantity of the fluidizing gas and the bed height. The fluidizing gas is regulated between the lower limit set by that quantity required to obtain mixing in the bed and the upper limit as determined by the conveying velocity of the solids at the approach to the reactor outlet. The bed height determines the area of the scrubbed wall surface and thereby allows regulation of the quantity of heat removed through the reactor wall. To insure an excess of chlorine in the reaction products and to react with any metallic aluminum particles entrained in the product gases, a secondary chlorine stream inlet can be provided in the reactor above the level of the bed. When a bed rich in aluminum is employed, the chlorine utilization will be found to be substantially complete.

To a clearer understanding of the invention, the following illustrative examples are given, none of which is to be considered as in limitation of the invention:

Example I

A mixture of 20.6 mol parts by weight per hour of titanium tetrachloride vapor at 19 p. s. i. g. and 2.33 mol parts per hour of chlorine was admitted to an oil-jacketed chlorination reactor containing a fluidized bed four feet deep (static measurement) made up of mullite (particle size range of 14 to 44 mesh) and granulated aluminum ingot (99.8 Al), the ratio, in pounds, of mullite to aluminum being 3:1. Aluminum additions were made at one minute intervals, the rate being 1.15 mole parts per hour. During the operation a bed temperature of 370° C. prevailed. The superficial linear gas velocity was maintained at 2.1 ft./sec. as estimated by the volume of gases being handled at the bed temperature and at the pressure existing above the bed (16.5 p. s. i. g.). From this operation there was obtained a mixture of a pure aluminum trichloride (representing by chemical analysis a 74% chlorine utilization) and titanium tetrachloride.

Example II 182 pounds per hour of titanium tetrachloride vapor at 3 p. s. i. g. were mixed with 7.6 pounds per hour chlorine and introduced into a separate inlet of an air-jacketed chlorination reactor containing 12 pounds of mullite (14–44 mesh) and 4 pounds of aluminum (granulated ingot) to form a fluidized reaction bed. Aluminum additions of .5 pound each to the bed were made at 15 to 20 minute intervals. The bed temperature was maintained at 302° C. The estimated superficial linear gas velocity was maintained at 2.4 ft./sec., the pressure above the bed being 1 p. s. i. g. By analyses of the aluminum chloride-titanium tetrachloride product gas, the chlorine utilization varied from 94.2–99.0% and averaged 95.7% complete.

Example III 18.7 mole parts by weight of titanium tetrachloride vapor at 18.1 p. s. i. g. were mixed with 3.08 mole parts of chlorine vapor and the mixture admitted at a velocity of 32 ft./sec. to an oil jacketed reactor containing a fluidized bed (four feet in depth by static measurement) composed of mullite (14 to 44 mesh) and granulated aluminum ingot, the weight ratio of mullite to aluminum being about 3:1. Granulated aluminum ingot (99.8+ Al) was added at 68 second intervals, at a rate equivalent to 0.98 mole part per hour, to the solids bed being fluidized by the flow of titanium tetrachloride and chlorine. The aluminum reacted with a portion of the chlorine to form aluminum trichloride, the heat of the reaction, over and above that lost to the titanium tetrachloride vapor and to the wall coolant oil, being sufficient to hold the bed temperature at 365° C. The superficial gas velocity based on the volume of gases at the temperature of the bed and at the pressure existing immediately downstream of the fluidized bed was 2.0 feet per second. The product mixture of titanium tetrachloride, aluminum trichloride, and chlorine at 14.5 p. s. i. g. was exhausted from the reactor into an associated cyclone wherein entrained solids were removed from the gaseous product mixture. The stream discharged from the cyclone into a metered stream of titanium tetrachloride vapor (41.8 mole parts/hour). The resulting $TiCl_4$—$AlCl_3$—$Cl_2$ mixture was preheated to 850° C. in a corrosion-resistant heat exchanger and continuously reacted with a hot oxygen-bearing gas, containing a small amount of water vapor and 10% excess oxygen over that required to react with the titanium and aluminum chlorides to form $TiO_2$ and $Al_2O_3$. Composited hourly samples of the titanium dioxide pigment product after separation from the gaseous reaction products indicated an average of 1.05% $Al_2O_3$ by weight in the pigment, the daily maximum being 1.12% and the minimum being 0.99%, over a period of several operating days.

Although the invention has been described particularly as applied to certain specific embodiments, these are merely preferred. Obviously, variance therefrom can be had without departing from its underlying principles and scope. Thus, the reactor size is dependent on the quantity of aluminum chloride or halide to be produced, the particle size range of the solids comprising the bed, the heat transfer characteristics of and the area of scrubbed reactor wall, the heat capacity of the fluidizing gas and the maximum desired bed temperature. For example, in a reactor which produces up to 200 pounds of aluminum chloride per hour using 14 to 44 mesh mullite as the inert bed material, with superficial linear gas velocities of 1.5 to 3.0 ft./sec. (about 2 ft./sec. being the preferred velocity) and with titanium tetrachloride vapor as the fluidizing medium, bed temperatures in the range of 180° C. to 400° C. are preferred for use. The reaction can be initiated at as low as 130° C. and the maximum allowable temperature comprises that approaching the softening point of aluminum at which there is reaction between titanium tetrachloride and aluminum, as well as imperfect fluidization, and resultant channeling.

As already noted, any suitable finely divided, inert material, including quartz, siliceous, or metal silicate product, can be employed as the inert solids used for the bed material, and should constitute a major portion of the solids content of the bed. While a weight ratio of about 3/1 inert solids to granular aluminum metal has been found to be most convenient and preferred for use, the exact ratio will depend on temperature employed, the heat capacities of the inert solids used, the ratio of inert titanium halide to halogen gas, the specific gravity and particle size range of said solids, and the particle size of the aluminum metal employed. The inert solids should be relatively small in particle size as compared to the aluminum metal particles, the optimum particle size thereof varying according to the specific gravity of the material used. For an aluminum silicate ($3Al_2O_3.2SiO_2$) such as the mullite used in the examples, a particle size range of 10–200 mesh material can be used, although a range of 14 to 44 mesh is preferred for this type of inert material. For a $SiO_2$ sand, a range of 40–200 mesh can be used, with a range of 50–70 mesh being preferred. However, reactor design can be adjusted to accommodate wider variations in particle size.

The initial particle size of the aluminum metal employed can vary from 2 to 20 mesh and larger sizes, although use is preferred of commercial granulated ingot having for the most part close to 3–4 mesh range. The choice of the solids for the bed material will determine the practical range of superficial linear gas velocities to be used. If, for example, a bed of 100–200 mesh sand is used, in chlorinating 8 mesh or finer aluminum particles, velocities of .4 to .6 ft./sec. are preferred, while with coarser solids higher linear velocities can be resorted to. Conventional equipment including cyclones and filters can be used in conjunction with the chlorinator to separate out the fines of mullite and/or oxides of aluminum originating as impurities in the aluminum carried over from the reactor.

While aluminum chloride production is particularly contemplated, the process of the invention is applicable to aluminum halides generally in which the halogen components have atomic numbers of 17 to 53, e. g., chlorine, bromine, and iodine. Thus, by the use of bromine vapor as the halogen, aluminum bromide vapor can be produced and, by use of iodine vapor, aluminum iodide vapor can be prepared. The titanium halide used as an inert fluidizing, diluting coolant vapor can also comprise the chloride, bromide or iodide, and usually is the corresponding titanium halide. Thus, for producing aluminum iodide vapor, titanium iodide is used. If desired, however, more than one of the halides can be satisfactorily used. Thus, a mixture of chlorine and bromine vapor can be introduced into the reactor to obtain a mixed aluminum halide product. Furthermore, if desired, chlorine vapor can be introduced as the halogen, while titanium bromide is simultaneously commingled, as a part of the fluidizing gas stream. The titanium halide fluidizing vapor is also used in major proportion, compared to the halogen vapor, and while a weight ratio of the order of 20/1 is usefully effective, preferred limits of this ratio will be found to be variable since reactor conditions can vary widely in respect to operable dilution.

The present invention will be found to provide a system for the generation of aluminum halide adapted to be operated at elevated or reduced pressures, easily controlled in regard to production rate, and one which allows considerable range of production rate and a relatively wide range in choice of materials of construction. One salient advantage arises from the fact that it readily affords a practical, low temperature pressurized operation. This unit offers a means of introducing aluminum halide vapor to a pressurized process stream without exposing the aluminum halide to undesirable reactant type atomspheres.

Most commercial aluminum halide contains some combined moisture detrimental to the process for which it is used or giving rise to other problems such as fouling of heat transfer surfaces if vaporization or sublimitation of the aluminum trichloride is required.

A further advantage of the invention is that it affords instantaneous thruput control of the amount of aluminum halide vapor being produced. The aluminum halide production rate depends upon the aluminum surface available as well as the halogen feed rate. The halogenation reaction itself within the temperature limits prescribed is very rapid and therefore adjustments in the rate of halogen addition to the system are immediately reflected in the rate of aluminum halide being produced. The rate of production is affected by changing the rate of aluminum addition but less rapidly because of the inventory of aluminum in the reactor and the rate is held at the new desired value as the amount of aluminum surface becomes stabilized. Such control is very difficult with other methods, such as, for example, the addition of solid aluminum halide to liquid titanium halide before vaporization. Furthermore, the process is easily shut down, merely by cutting off the halogen feed to the reactor, flushing the aluminum-containing bed with the inert fluidizing medium. Start-up is equally easy, fluidizing being obtained with the inert fluidizing medium and allowing the flow of halogen to commence.

Another important advantage of the process is that aluminum oxide scale formed is readily separated out, being left as unreacted fines for eventual blowing out of the reactor and eliminated from the product in the solids separation equipment. The aluminum halide product is also advantageously free of other metal halide impurities, depending upon the degree of purity of the initial aluminum metal. Furthermore, due to the low wall temperature and low reaction temperature used, a wider choice of metals as more economical materials of construction for the reactor and discharge vapor lines is afforded without encountering objectionable introduction of interfering metal halide impurities into the product.

A particular advantage of the invention resides in the direct use of the anhydrous vaporized aluminum halide obtained as a reactant in other chemical processes. It is particularly useful in processes in co-function with a titanium halide vapor in the vapor phase oxidation of titanium tetrachloride to produce pigmentary titanium dioxide. Thus, pigment quality control is materially assisted by the regulated addition of small amounts (from about 0.1% to 10%, by weight, based on the tetrachloride) of the aluminum chloride to the titanium tetrachloride before vapor phase co-oxidation in the presence of from .05% to 10% by volume, based on the gases being reacted, of water vapor, in accordance with the methods disclosed in U. S. Patent 2,559,638, already referred to. Other vapor phase chemical reactions of the titanium halides can be similarly modified to obtain changes or benefits from the addition of aluminum halide as a co-reactant.

I claim as my invention:

1. In a process for producing titanium dioxide, the improvement comprising charging discrete aluminum metal particles into a reactor while fluidizing therein a bed made up of aluminum metal particles and a larger portion of finely divided particles of an inert solid, the fluidizing means being a gaseous mixture of titanium tetrahalide and a halogen having an atomic number of 17 to 53, maintaining the temperature of the fluidizing bed below the softening temperature of said aluminum particles and above the condensation temperature of the resulting aluminum halide product by regulating the quantity and temperature of the fluidizing means and the height of said bed, and passing the vaporous mixture of aluminum trihalide and titanium tetrahalide which evolves from the reactor into a reactor for the vapor phase oxidation of the titanium tetrahalide.

2. The process of claim 1 in which the aluminum trihalide is aluminum trichloride, the titanium tetrahalide is titanium tetrachloride and the halogen is chlorine.

3. In a process for producing titanium dioxide, the improvement comprising charging discrete aluminum particles into a reactor while fluidizing therein a bed made up of aluminum metal particles and a larger portion of finely divided particles of an inert solid, the fluidizing means consisting essentially of a major portion of titanium tetrachloride and a minor portion of chlorine, maintaining the temperature of the fluidizing bed below the softening temperature of said aluminum particles and above the condensation temperature of the resulting aluminum chloride product by regulating the quantity and temperature of the fluidizing means and the height of the bed, and passing the vaporous mixture of aluminum trichloride and the titanium tetrachloride which evolves from the reactor into a reactor for the vapor phase oxidation of the titanium tetrachloride.

4. The process of claim 3 in which the finely divided particles of inert solid are quartz particles.

5. The process of claim 3 in which the finely divided particles of inert solid are mullite particles.

6. In a process for producing titanium dioxide, the improvement comprising charging discrete aluminum particles into a reactor while fluidizing therein a bed made up of aluminum metal particles and a larger portion of finely divided particles of an inert solid, the fluidizing means consisting essentially of a major portion of titanium tetrachloride and a minor portion of chlorine, maintaining the temperature of said bed throughout the reaction at from 180–400° C. by regulating the quantity and temperature of the fluidizing means and the height of the bed, and passing the vaporous mixture of aluminum trichloride and the titanium tetrachloride which evolves from the reactor into a reactor for the vapor phase oxidation of the titanium tetrachloride.

7. In a process for producing a vaporized mixture of aluminum trichloride and titanium tetrachloride free of interfering metal chloride impurities and employable in the vapor phase co-oxidation process to obtain pigmentary $TiO_2$ therefrom the improvement which comprises adding discrete aluminum metal particles to a reactor while fluidizing therein a bed made up of aluminum metal particles and a larger portion of finely divided particles of an inert solid, the fluidizing means consisting essentially of a major portion of titanium chloride with a minor portion of chlorine, maintaining said fluidizing bed continuously at temperatures below the softening temperature of said aluminum metal particles and above the condensation temperature of the resulting aluminum chloride reaction product by regulating the quantity and temperature of the fluidizing means and the height of said bed, separating entrained solid particles from the gaseous mixture of aluminum trichloride and titanium tetrachloride products withdrawn from said reactor and introducing the latter mixture as reactants into said co-oxidation process.

8. In a process for producing titanium dioxide, the improvement comprising charging discrete aluminum particles into a reactor while fluidizing therein a bed made up of aluminum metal particles and a larger portion of finely divided particles of an inert solid, the fluidizing means consisting essentially of a major portion of titanium tetrachloride and a minor portion of chlorine, maintaining the temperature of the fluidizing bed below the softening temperature of said aluminum particles and above the condensation temperature of the resulting aluminum chloride product by regulating the quantity and temperature of the fluidizing medium and the height of the bed, introducing additional chlorine into the vaporous mixture evolving from the fluidizing bed in an amount sufficient to react with the aluminum particles entrained in said vaporous mixture, and passing the vaporous mixture of aluminum trichloride and titanium tetrachloride which evolves from the reactor into a reactor for the vapor phase oxidation of the titanium tetrachloride.

9. In a process for producing titanium dioxide, the improvement which comprises fluidizing within a reactor a bed made up of aluminum particles and a larger portion of finely divided particles of an inert solid, said fluidizing means consisting of a major portion of titanium tetrachloride and a minor portion of chlorine, concurrently adding additional aluminum metal particles at a rate which is substantially equivalent to the diminution of the aluminum particles in said bed as a result of the reaction between the aluminum particles and the chlorine to form aluminum trichloride, maintaining the temperature of the fluidizing bed below the softening temperature of said aluminum particles and above the condensation temperature of the resulting aluminum chloride product by regulating the quantity and temperature of the fluidizing medium and the height of the bed, and passing the vaporous mixture of aluminum trichloride and the titanium tetrachloride which evolves from the reactor into a reactor for the vapor phase oxidation of the titanium tetrachloride.

10. The process of claim 9 in which the weight ratio of titanium tetrachloride to chlorine is 20:1.

References Cited in the file of this patent
UNITED STATES PATENTS

| | | |
|---|---|---|
| 1,268,015 | King | May 28, 1918 |
| 2,385,505 | Grimble | Sept. 25, 1945 |
| 2,486,912 | Belchetz | Nov. 1, 1949 |
| 2,539,263 | Munday | Jan. 23, 1951 |
| 2,548,875 | Degnen | Apr. 17, 1951 |
| 2,559,638 | Krchma | July 10, 1951 |
| 2,582,246 | Garbo | Jan. 15, 1952 |
| 2,593,338 | Ogorzaly | Apr. 15, 1952 |
| 2,614,028 | Schaumann | Oct. 14, 1952 |

FOREIGN PATENTS

| | | |
|---|---|---|
| 222,315 | Canada | Aug. 15, 1922 |